United States Patent [19]

Hamabe et al.

[11] 4,433,359

[45] Feb. 21, 1984

[54] METALLIZED FILM CAPACITORS

[75] Inventors: Takeshi Hamabe, Nishinomiya; Tatsuya Nakamura, Toyonaka, both of Japan

[73] Assignee: Matsushita Electric Industrial Co., Ltd., Kadoma, Japan

[21] Appl. No.: 357,616

[22] Filed: Mar. 12, 1982

[30] Foreign Application Priority Data

Mar. 19, 1981 [JP] Japan .................................. 56-41180
May 28, 1981 [JP] Japan .................................. 56-82265
Jun. 19, 1981 [JP] Japan .................................. 56-95856

[51] Int. Cl.³ ........................ H01G 1/13; H01G 3/10
[52] U.S. Cl. ................................... 361/273; 361/313; 361/323
[58] Field of Search ............... 361/273, 275, 304, 312, 361/301, 313, 323

[56] References Cited

U.S. PATENT DOCUMENTS

| 774,115 | 11/1904 | Splitdorf | 361/301 |
| 2,216,558 | 10/1940 | Ortlieb | 361/304 X |
| 3,012,176 | 12/1961 | Williams et al. | 361/313 |
| 3,148,315 | 9/1964 | Rondeau et al. | 361/304 |
| 3,590,347 | 6/1971 | Gottlob | 361/312 |
| 3,614,561 | 10/1971 | Behn et al. | 361/323 |

FOREIGN PATENT DOCUMENTS 1324010  7/1973  United Kingdom ............... 361/275

Primary Examiner—Donald A. Griffin
Attorney, Agent, or Firm—Cushman, Darby & Cushman

[57] ABSTRACT

The present invention relates to an improvement in a metallized film capacitor of wound-type and stacked-type which has been proposed to provide the capacitor with a protection function, i.e. an additional self-healing ability, at the time of dielectric breakdown. The vapor-deposited metal electrode of the capacitor is splitted into segments so that the capacitor itself can prevent a smoke-emitting or burning failure from actually occurring. The present invention improves the reliability of such the protection function by forming narrow current paths on the vapor-deposited metal electrode along a zone which makes it connect with the external connecting member. It also minimizes the loss in static capacitance and in material.

11 Claims, 12 Drawing Figures

METALLIZED FILM CAPACITORS

BACKGROUND OF THE INVENTION

1. Field of the Invention

The present invention relates to metallized film capacitors, and, particularly, to those for AC application.

2. Description of the Prior Art

Conventional metallized film capacitors, which are structured simply by rolling long metallized film into a cylindrical or flat shape, may emit smoke or be burnt when they are subjected to such a lethal dielectric breakdown that is exceeding the limit of the self-healing function inherent to the metallized film capacitor. In order to provide the capacitor with an additional protection function, that results in only slight decrease in its static capacitance but prevents the emitting of smoke or burning from actually occurring, an improvement had previously been proposed and filed as a patent application by the present inventors, Japanese Patent Application Nos. Sho 56-41180, Sho 56-82265 and Sho 56-95856 (U.S. Ser. No. 225,440, European Patent Application No. 81100315.1, Indonesian Patent Application No. 7859).

The proposed improvement comprises splitting the vapour-deposited metal electrode into a plurality of segments to give them a feature of severing a particular electrode from the group of other segmental electrodes by partly fusing off, when a breakdown occurs locally at the particular segmental electrode.

This structure of simply splitting the metallized film electrode into a plurality of segments has, however, a number of unsolved problems in the aspects of the reliability in its protection function and of the loss in material in its manufacturing process.

The structure of a wound-type metallized film capacitor is shown in a perspective view of FIG. 1, while that of a stacked-type is shown in a perspective view of FIG. 2. In FIG. 1, a vapour-deposited metal layer 2 on a dielectric material film 1 is splitted into segmental electrodes by grooves 3 that extend in the width-wise direction of the metallized film or strip such as a metallized polymeric material sheet or metallized paper. In FIG. 2, the stacked structure of the capacitor automatically means the splitting of the vapour-deposited metal layer 2 in FIG. 1(b) into the segmental electrodes.

In both of the wound-type and stacked-type capacitor comprising the segmental electrodes, the shown structure equals the aggregate of a multiplicity of minute capacitors connected with external connecting members represented by sprayed-metal layers. In a metallized film capacitor structured as shown in the above, when an excessively large current is flown through a particular segmental electrode as a result of the dielectric breakdown of the film and the current density in the segmental electrode participated in the dielectric breakdown rises abruptly, a part of the vapour-deposited metal electrode is fused off along a line or in a belt-like shape to electrically disconnect the segmental electrode from the others in the group of the segments. A sectional view of FIG. 3 illustrates a state of a capacitor element when such the phenomena occurs, namely, a dielectric breakdown results between the confronting pair of electrodes at a point 4. At least one of the segmental vapour-deposited electrodes 2a and 2b participated in the dielectric breakdown causes the belt-like fusing-off 5 of the metal layer to disconnect the segment from the body of the capacitor. In FIG. 3, numeral 6 represents layers of sprayed metal of the external connecting members.

FIG. 3' is a similar sectional view of a capacitor wherein one of both-side metallized films 1 is sandwiched between two non-metallized dielectric material films 18.

The both-side metallized films 1 have similar segmental vapour-deposited electrode layers 2a and 2b, and perform similar disconnecting function as described in connection with the films shown in FIG. 3. In both of FIGS. 3 and 3', the films are dipicted as they are loosely stacked with substantial spaces therebetween, though they are actually closely contacted with each other. Such a phenomenon likewise occurs in the cases wherein the dielectric breakdown consecutively develops to the adjacent layers.

The metallized film capacitor of the segmental electrode-type has thus been improved in its protection function that can prevent the lethal smoke-emitting or burning failure from actually occurring but may lead to a slight decrease in its static capacitance, even if the capacitor is subjected to an unexpected condition wherein an abnormally high voltage is applied to it or it is brought under an abnormally high temperature condition to cause a dielectric breakdown.

Accordingly, the metallized film capacitor of the segmental-electrode type does not need to be provided with a special protection device because it itself has the above-indicated improved self-protecting function, and can be made smaller in size and less expensive in corresponding degree, as compared with the conventional ones. In contrast to this, the latter comprising a single continuous vapour-deposited metal electrode needs to be provided with the special protection device for an unexpected service condition thus making the capacitor large in size and expensive in its manufacturing cost.

Although the above-indicated protection function can essentially be derived from the structure of the capacitor embodied as shown in FIG. 1 or FIG. 2, there still remains a number of unsolved problems. The problems may be itemized as follows; (1) the reliability of the protection function is unsatisfactorily low, (2) there is a considerable restriction on the width W (the width of the segmental electrode in the case of wound-type capacitor illustrated in FIG. 1 or the cutting width in the case of stacked-type capacitor illustrated in FIG. 2), and, as a result, the loss in material is large at the splitting groove (3 of FIG. 1) or in the cutting operation, and (3) disconnecting performance of the segmental electrode largely depends upon the condition of the part wherein the vapour-deposited metal electrode contacts the sprayed metal layer, and therefore the disconnecting characteristics largely deviate among the respective segmental electrodes.

SUMMARY OF THE INVENTION

It is therefore a primary object of the present invention to provide a solution for the unsolved problems inherent to the metallized film capacitor comprising a plurality of segmental electrodes.

According to the present invention, there is provided a metallized capacitor characterized in that; (a) at least one of the vapour-deposited metal layer electrodes of the same polarity electrode of the metallized strip is splitted into a plurality of segmental electrodes, (b) each of the segmental electrodes of the same polarity is connected together at the same potential by an external connecting layer of a conducting material, (c) each of the segmental electrodes constitutes a minute capacitor in combination with a facing counter electrode through a dielectric material layer interposed therebetween, and (d) at least one narrow path for current is formed on at least one face side of the segmental electrodes.

DESCRIPTION OF THE PREFERRED EMBODIMENTS

In the embodiment of the present invention, the "narrow paths for current" means blank spaces, wherein the vapour-deposited metal layer on a dielectric material layer is partly removed, or cracks formed on the metal layer at which the disconnection of the segmental electrode occurs at the time of dielectric breakdown.

Figure 4:
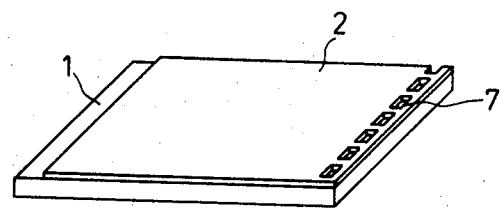
FIGS. 4 and 5 are perspective views each showing a single segmental electrode in an embodiment of the present invention together with the corresponding portion of the substrate dielectric material layer.
Figure 5:
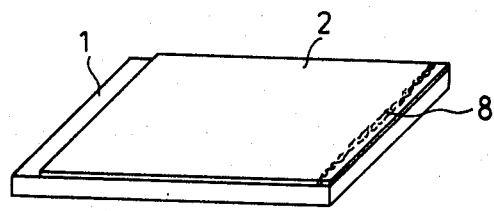

FIGS. 4 and 5 are the perspective views each showing one of the segmental electrodes. In FIG. 4, numeral 7 represents the blank spaces wherein the vapour-deposited metal layer is removed while in FIG. 5, numeral 8 represents the cracks in the vapour-deposited metal layer. The blank spaces wherein the vapour-deposited metal layer is partly removed mean a blank space or area on the vapour-deposited metal electrode. The blank spaces are formed by partly removing the once deposited metal layer in, for instance, a discharge treatment after a vacuum-deposition process. They may alternatively be formed by a mask method, an oil margin method, or an oil-transferring metal deposition method.

The formation of the narrow paths such as the blank spaces or the cracks in the vapour-deposited metal layer substantially amounts to the shortening of the width W of the segmental electrodes. Accordingly, it can raise the current density of the segmental electrodes, thereby shortening the time period required for the completion of the disconnection at the time of the dielectric breakdown and thus making the electric charge required therefor small. As a result, a trace of the spot where the dielectric breakdown occurs becomes small. The restriction imposed on the width W (FIG. 1) of the segmental electrode or of the cutting width W (FIG. 2) in view of maintaining the protection function can be lightened in great deal, and the previously described problem of the loss in material can also be solved favorably. These facts mean that the formation of the blank spaces or cracks in the vapour-deposited metal layer provides the capacitor with a more reliable protection function.

Figure 6:
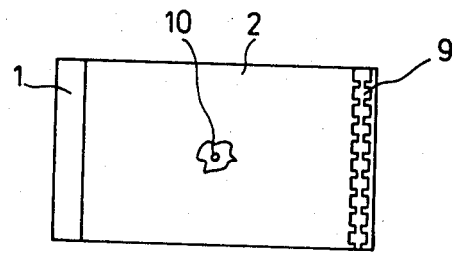
FIGS. 6 and 7 are plan views each representing a state of disconnected portion of vapour-deposited metal layers.
Figure 7:
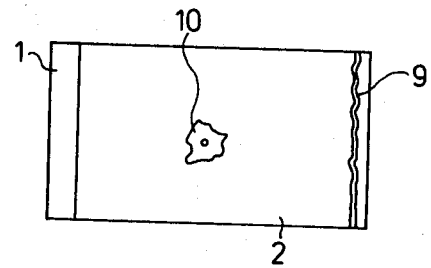

The segmental electrodes at their disconnected states are shown in plan views of FIGS. 6 and 7, the former represents the case wherein the blank spaces are formed on the vapour-deposited metal layer and the latter represents the case wherein the cracks are formed thereon. In both of the figures, numeral 9 represents the parts where the vapour-deposited metal layer is fused off and numeral 10 represents the spot where the dielectric breakdown has occurred.

Thus, the present invention improves the disconnecting characteristics of the each of the segmental electrodes by forming narrow current paths such as blank spaces or cracks in the vapour-deposited metal layer to limit the total current path therethrough and by raising the current density in the segmental electrodes. Incidentally, a path ratio ($w/W \times 100$) is defined here by taking the width of the segmental electrodes as W and the total width of the remaining vapour-deposited metal layer which equals to the current path after the formation of the blank spaces or cracks as w.

The disconnecting characteristics of the segmental electrodes are of course depending on the path ratio, and can be improved much as the value of the latter is lowered. The charge/discharge characteristics of the capacitor may however be lowered with the lowering of the path ratio. Therefore the value should practically be selected in the range of 2–75% by considering the voltage rating, static capacitance and use (service condition) of the capacitor and by further taking the structure of the capacitor and the electrode itself into account as well.

The present inventors have further found the structures or arrangements of the capacitor and/or that of the electrode each of which provides a capacitor with excellent disconnecting characteristics as well as good charge/discharge characteristics.

Figure 8:
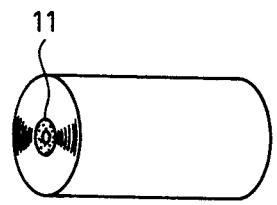
FIG. 8 is a perspective view of the wound-type capacitor specifically illustrating a pressure-buffering member 11 placed in the core of the wound body.

A first structure shown in FIG. 8 includes the provision of a pressure buffering member, for example, a foam sponge-like body 11 of polymeric material at the core of a wound body as shown in FIG. 8 in the case of a wound-type capacitor. This pressure buffering member serves to flow a pulse current instead of an ohmic current through the capacitor at the time of its dielectric breakdown to improve the disconnecting characteristics. The fact may be explained as follows:

In general, the current flown at the time of dielectric breakdown becomes ohmic current if discharge resistance of the dielectric material is large but becomes pulse current of micro second order if the resistance is small. The present inventors have confirmed in an experiment the fact that the foam body serves to absorve the pressure caused by expanding capacitor element at the time of dielectric breakdown and to make the current therethrough pulse-form. By doing so, the path ratio can be set at its high level.

Figure 9:
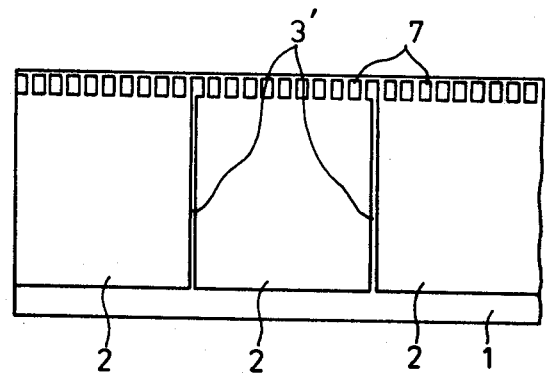
FIG. 9 is a perspective view of a metallized film showing a structure of the segmental electrode in one embodiment of the present invention.

A second structure is a particular structure of the segmental electrodes as shown in FIG. 9, wherein the splitting grooves 3' do not extend to the total width of the electrode but do stop at the blank spaces. This structure means that all of the segmental electrodes are connected together at a thin strip where one edge of the electrode is in contact with the sprayed metal layer and thus can prevent the deterioration of the charge/discharge characteristics attributable to the poor connection of the vapour-deposited metal layer with the sprayed metal layer.

Figure 10:
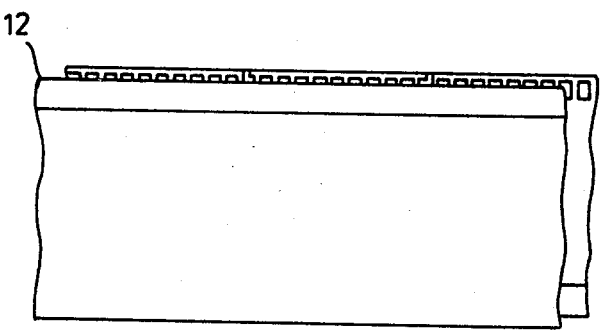
FIG. 10 is a plan view showing a positional relationship between the blank spaces where the vapour-deposited metal layer of one of the metallized films and one edge of the other metallized film.

A third structure includes a particular manner of placing a metallized film over another film forming a pair with the first film as shown in FIG. 10, wherein an edge 12 of the another film which contacts the first film having the segmental electrodes is placed on the blank spaces or cracks of the latter to improve the disconnecting characteristics by the holding-down action of the edge 12.

The pressure exerted by the holding-down action of the edge of the paired film, on a zone of the vapour-deposited metal electrode along which the blank spaces are aligned is attributable to the particular structure of the wound-body wherein it has a stepwisely differentiated density of lamination, and causes to provide the zone with many invisible flaws which serve to enable the narrow current paths to disconnect with less energy at the time of dielectric breakdown. This structure is also capable of serving to set the path ratio at its high level.

The position where the blank spaces or the cracks of the present invention are formed is also very critical and should preferably be selected so that the position does not face the counter electrode. The present invention does not exclude the possibility of forming the blank spaces or cracks at a position facing the counter electrode, though it is not practical because it may result in the loss of static capacitance or in the increase of parts whereupon the electric field concentrates uselessly.

In the following description the present invention will be illustrated in more detail by way of working examples in comparison with conventional ones of the following specifications:

Conventional capacitor 1

A capacitor of 30 $\mu$F, formed by winding two single-side metallized polyethylene terephthalate films (thickness, 6 $\mu$m; width, 60 mm; specific resistance of the vapour-deposited metal layer, 3.0–3.5 $\Omega$/square) around a core of 10 mm in diameter, one of the film being offset by 1 mm with respect to the other. The vapour-deposited metal layers of this capacitor are single long electrodes.

Conventional capacitor 2

Figure 1A:
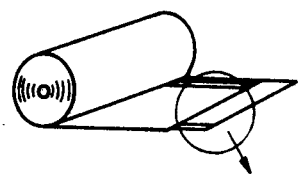
FIG. 1 is the perspective view showing a structure of segmental electrodes in a wound-type metallized film capacitor.
Figure 1B:
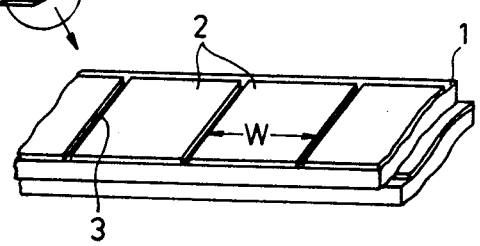

A wound-type capacitor of 5 $\mu$F, structured as the conventional capacitor 1, wherein one of the vapour-deposited metal layer being splitted into segmental electrodes of 20 mm width as shown in FIG. 1.

Conventional capacitor 3

A wound-type capacitor of 30 $\mu$F, structured as the conventional capacitor 1, wherein one of the vapour-deposited metal layer being splitted into segmental electrodes of 60 mm as shown in FIG. 1.

Conventional capacitor 4

Figure 2:
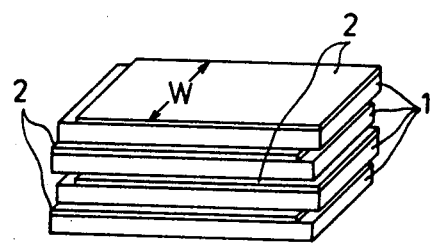
FIG. 2 is the perspective view showing a structure of segmental electrodes in a stacked-type metallized film capacitor.

A stacked-type capacitor of 30 $\mu$F, prepared by using the same films as those used in the conventional capacitor 1 and structured as shown in FIG. 2 with the cutting width of 60 mm.

Example 1

A wound-type capacitor of 30 $\mu$F, structured as the conventional capacitor 3 in its film and width of the segmental electrode, with blank spaces formed on the vapour-deposited metal layer as shown in FIG. 4. The blank spaces of 2 mm width, 4 mm length and 1 mm interval are formed along a line parallel to and 2 mm distant from the edge of the film on the side which contacts the sprayed metal layer. Therefore, the path ratio of the capacitor equals to 20%.

Example 2

A stacked-type capacitor of 30 $\mu$F, structured as the conventional capacitor 4 in its film and the cutting width, with blank spaces formed as in Example 1 to give a path ratio of 20%.

Example 3

A wound-type capacitor of 5 $\mu$F, structured as the conventional capacitor 2 in its film and in the width of the segmental electrodes, with blank spaces formed in the segmental electrodes as shown in FIG. 4. The blank spaces of 2 mm width and 2 mm length are formed with 6 mm intervals along a line parallel to and 2 mm distant from one of the edges of the film to give an average path ratio of 75% to the capacitor.

Example 4

A wound-type capacitor of 50 $\mu$F, structured as in the conventional capacitor 3 in its film, but with the width of the segmental electrodes of 200 mm, to give a path ratio of 5%.

Example 5

A wound-type capacitor of 30 $\mu$F, structured as in the conventional capacitor 3 in its film and the width of the segmental electrodes, with the cracks formed on the segmental electrodes as shown in FIG. 5 to give a path ratio of 20% determined by microscopic observation.

Example 6

A wound-type capacitor of 50 $\mu$F, structured as in Example 4 in its film and in the width of the segmental electrodes, with a core of foam polymeric pipe of 4 mm thickness which serves as a mechanical pressure buffering member at the center of the wound body as shown in FIG. 8. The path ratio of this capacitor is 11%.

Example 7

A wound-type capacitor of 50 $\mu$F, structured as in Example 4 in its film and in the width of the segmental electrodes, with the same path ratio but the structure of the segmental electrodes being as in FIG. 9.

In all of the above-mentioned Examples, the operations of splitting the electrode into segments in the wound-type capacitor and of forming the blank spaces on the vapour-deposited metal layer in both of the wound- and stacked-type capacitors were performed in accordance with a so-called discharge process wherein a voltage is applied across the vapour-deposited metal layer and a discharge electrode while the both are in contact with each other to burn off the vapour-deposited metal layer with the energy consumed for the discharge. The present invention will not limit the operations to be performed in accordance with the above-mentioned process and the present inventors have confirmed that the operation of forming splitting grooves and forming blank spaces can alternatively be performed during the vacuum-deposition process. They may be formed as depositing patterns, by, for instance, masking or oil-transferring, as previously described.

The operation of forming cracks was carried out by placing the metallized film between a grooved roller and a rubber roller and then applying a pressure thereon through the rollers.

As regards the positional relationship between the two metallized films forming a pair as adjacent members and being wound or stacked one over the other, the edge of the second film was placed over to be aligned with the line of the blank spaces or cracks on the first film in all of the above examples. However, the present invention does not exclude the possibility of other positional relationships.

Ten (10) specimens were prepared for each of the above-mentioned conventional capacitors and working examples in accordance with the specifications set forth. Then they were finished by being sprayed with zinc at their ends, subjected to thermal aging at 120° C. for 15 Hrs, soldered with lead-out wires, subjected to preliminal voltage withstand treatments and then coated with epoxide resin.

Those specimens were then subjected to protection function tests and charge/discharge tests. The protection functions of the specimens were evaluated in terms of the smoke-emitting or burning in a forced dielectric breakdown test performed by applying a voltage of 350 VAC at 120° C. The charge/discharge characteristics were evaluated in terms of the decrease in the static capacitance after a treatment wherein a voltage of 400 VDC was repeatedly applied to the specimen up to 30 times.

The results of the above-mentioned tests are summarized in the following table:

TABLE

|  | Protection function test (Frequency of smoke-emitting or burning, n = 10) | Charge/discharge test (− ΔC/C, %) |
|---|---|---|
| Conventional capacitor 1 | 10/10 | 0 |
| Conventional capacitor 2 | 1/10 | 2.35 |
| Conventional capacitor 3 | 8/10 | 0.38 |
| Conventional capacitor 4 | 8/10 | 0.36 |
| Example 1 | 0/10 | 0.58 |
| Example 2 | " | 0.50 |
| Example 3 | " | 2.39 |
| Example 4 | " | 0.81 |
| Example 5 | " | 0.55 |
| Example 6 | " | 0.64 |
| Example 7 | " | 0.36 |

From the results, the following facts are found;

(1) The protection functions of the capacitors have been remarkably improved by embodying the present invention; neither of smoke-emitting or burning is occurred.

(2) The charge/discharge characteristics have, on the other hand, been slightly lowered but this disadvantage can be overcome by embodying the electrode structure as employed in Example 7.

(3) The protection function of the capacitor can be maintained favorably even in the case of larger segmental electrode width. As a result, loss in material, in other words, the loss in static capacity can be minimized.

In the above description, the present invention has thus been illustrated by referring to its several materials and structures which can be employed in the preferred embodiment, though the scope of the present invention should not be construed too restrictively and instead, materials other than those illustrated above, for instance, films whose both sides are metallized and films of other materials may also be used in embodying the present invention.

Figure 3:
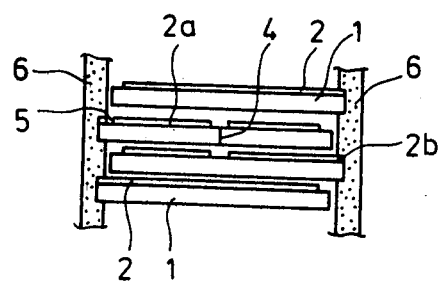
FIG. 3 is the sectional view showing a performance of the protection function of the metallized film capacitor of the segmental electrodes-type when the capacitor is subjected to a dielectric breakdown, FIG. 3' is the similar sectional view of another type of capacitor, wherein both side metallized films are sandwiched between dielectric material films.
Figure 3:
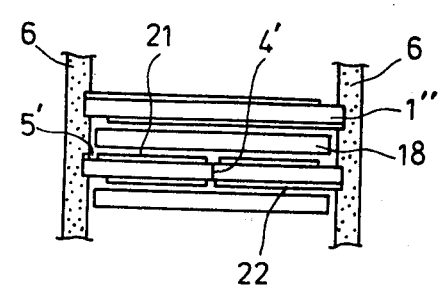

Namely, the present invention can be embodied in arrangements wherein a combination of a metallized polyethylene terephthalate film having vapour-deposited metal layers on both sides thereof and a (non-metallized) polypropylene film (FIG. 3'), that of two single side metallized polypropylene films and the like, are used. Any of the above combination can be embodied in an oil-filled or oil-impregnated type.

As indicated above, the present invention provides a metallized film capacitor of segmental electrode type with an additional reliable protection function by forming blank spaces, wherein the vapour-deposited metal layer is partly removed from the metallized film, or cracks on the metal layer in the segmental electrodes of the wound-type or stacked-type capacitor is partly formed.

Accordingly, in using the metallized film capacitor embodying the present invention, there is no need to emply additional proof means. Therefore, it is possible to miniturarize the size of the capacitors. The present invention thus has great advantages in technical and economical points of view.

What is claimed is:

1. A metallized plastic film capacitor having at least one vapour-deposited metal layer electrode and a counter electrode characterized in that
    (a) said at least one vapour-deposited metal layer electrode of the same polarity electrode formed of a metallized strip which has been split into a plurality of segmental electrodes,
    (b) each of the segmental electrodes of the same polarity being connected together at the same potential by an external connecting layer of a conducting material,
    (c) each of the segmental electrodes, constituting a minute capacitor in combination with said facing counter electrode through a dielectric material layer interposed therebetween, and
    (d) plural narrow paths for current being formed on at least one side face of confronting segmental electrodes.

2. A metallized plastic film capacitor as claimed in claim 1, further characterized in that said narrow paths for current are formed by providing the segmental electrodes with blank spaces, wherein the vapour-deposited metal layer is partly removed, along a line parallel to an edge of the electrode which contacts said external connecting layer.

3. A metallized plastic film capacitor as claimed in claim 2, further characterized in that said blank spaces are formed by a discharge treatment wherein the once vapour-deposited metal layer on the dielectric material layer of the film is burnt off with the energy consumed for the discharge between the metal layer and a discharge electrode.

4. A metallized plastic film capacitor as claimed in claim 2, further characterized in that said blank spaces are formed during the vacuum-deposition process in desired patterns.

5. A metallized plastic film capacitor as claimed in claim 1, further characterized in that said narrow paths for current are formed by providing the segmental electrode with cracks on the vapour-deposited metal layer along a line parallel to an edge of the electrode which is in contact with the external connecting layer.

6. A metallized plastic film capacitor as claimed in claim 1, further characterized in that one edge of the counter electrode film which contacts the metallized film having the narrow paths is placed on the narrow paths.

7. A metallized plastic film capacitor as claimed in claim 1, wherein a path ratio ranges from 2 to 75%, wherein said path ratio (w/W×100) is defined by taking the width of the segmental electrodes as W and the total width of the remaining vapour-deposited metal layer as w.

8. A metallized plastic film capacitor as claimed in claim 1, further characterized in that the capacitor is wound-type and a pressure-buffering member is placed at the core of the wound-body.

9. A metallized plastic film capacitor as claimed in claim 1, further characterized in that the capacitor is a wound-type and grooves for having split the electrode into segments do not extend to the total width of the electrode but do stop at the narrow paths.

10. A metallized plastic film capacitor as claimed in claim 1, further characterized in that the capacitor is an oil-filled or oil-impregnated type.

11. A metallized plastic film capacitor as claimed in claim 1, further characterized in that the capacitor is a stacked-type capacitor.

* * * * *